(12) United States Patent
Ordogh

(10) Patent No.: US 8,432,273 B2
(45) Date of Patent: Apr. 30, 2013

(54) METHOD AND APPARATUS FOR PROVIDING DEVICE RECOVERY ASSISTANCE

(75) Inventor: Zoltan Ordogh, Tampere (FI)

(73) Assignee: Nokia Corporation, Espoo (FI)

( * ) Notice: Subject to any disclaimer, the term of this patent is extended or adjusted under 35 U.S.C. 154(b) by 514 days.

(21) Appl. No.: 12/712,909

(22) Filed: Feb. 25, 2010

(65) Prior Publication Data

US 2010/0219979 A1 Sep. 2, 2010

Related U.S. Application Data

(60) Provisional application No. 61/156,201, filed on Feb. 27, 2009.

(51) Int. Cl.
*G08B 1/08* (2006.01)
*G08G 1/123* (2006.01)
*H04M 1/66* (2006.01)
*H04M 1/00* (2006.01)
*H04B 1/034* (2006.01)

(52) U.S. Cl.
USPC ...... 340/539.11; 340/988; 340/993; 455/410; 455/411; 455/550.1; 455/95

(58) Field of Classification Search .......................... None
See application file for complete search history.

(56) References Cited

U.S. PATENT DOCUMENTS

| | | | | | |
|---|---|---|---|---|---|
| 5,646,977 | A | * | 7/1997 | Koizumi | 455/411 |
| 6,002,362 | A | * | 12/1999 | Gudat | 342/357.27 |
| 6,167,252 | A | * | 12/2000 | Cohen | 455/410 |
| 7,181,252 | B2 | | 2/2007 | Komsi | |
| 7,446,655 | B2 | | 11/2008 | Jha et al. | |
| 2004/0110488 | A1 | * | 6/2004 | Komsi | 455/411 |
| 2005/0280557 | A1 | * | 12/2005 | Jha et al. | 340/988 |
| 2006/0293052 | A1 | * | 12/2006 | Orler et al. | 455/434 |
| 2008/0186162 | A1 | * | 8/2008 | Rajan et al. | 340/539.13 |

FOREIGN PATENT DOCUMENTS

| | | |
|---|---|---|
| EP | 1241907 A1 | 9/2002 |
| EP | 1684535 A1 | 7/2006 |
| WO | 03096726 A2 | 11/2003 |

OTHER PUBLICATIONS

The International Search Report and the Written Opinion of the International Searching Authority for corresponding PCT Application No. PCT/IB2010/000387, 13 pages.

* cited by examiner

*Primary Examiner* — Jennifer Mehmood
*Assistant Examiner* — Fekadeselassie Girma
(74) *Attorney, Agent, or Firm* — Alston & Bird LLP

(57) ABSTRACT

An apparatus for providing device recovery assistance may include at least one processor and at least one memory including computer program code. The at least one memory and the computer program code may be configured, with the processor, to cause the apparatus to perform at least causing a device to be registered with a service, receiving a verification procedure from a platform associated with the service, the verification procedure defining device recovery parameters associated with maintenance of a loss status indicator indicating a loss status of the device, causing a device identifier associated with the device to be stored in a permanent storage medium of the device, and enabling device location reporting based on the received verification procedure in response to a determination that the device is classified as lost or stolen. A corresponding method and computer program product are also provided.

20 Claims, 4 Drawing Sheets

METHOD AND APPARATUS FOR PROVIDING DEVICE RECOVERY ASSISTANCE

CROSS REFERENCE TO RELATED APPLICATION

This application claims the benefit of U.S. Provisional Application No. 61/156,201, filed Feb. 27, 2009, the contents of which are incorporated herein in their entirety.

TECHNOLOGICAL FIELD

Embodiments of the present invention relate generally to device security and, more particularly, relate to an apparatus and method for enabling the provision of a mechanism for device recovery for devices capable of network communication.

BACKGROUND

Communication devices are becoming increasingly ubiquitous in the modern world. In particular, mobile communication devices seem to be popular with people of all ages, socio-economic backgrounds and sophistication levels. Accordingly, users of such devices are becoming increasingly attached to their respective mobile communication devices. Whether such devices are used for calling, emailing, sharing or consuming media content, gaming, navigation or various other activities, people are more connected to their devices and consequently more connected to each other and to the world at large.

Due to advances in processing power, memory management, application development, power management and other areas, communication devices, such as computers, mobile telephones, cameras, personal digital assistants (PDAs), media players and many others are becoming more capable. However, the popularity and utility of mobile communication devices has not only fueled sales and usage of such devices, but has also caused these devices to be increasingly more common targets for thieves. Moreover, even if a device is not stolen, it may be lost or forgotten somewhere and another individual may discover the lost item and desire to use it.

Providing an increased level of security for mobile communication devices may reduce the motivation for stealing such devices and thereby free up law enforcement resources to focus on other crimes and also increase the feeling of safety and security among citizens. Accordingly, several approaches have been undertaken to improve device security. In one approach, a stolen phone may be added to a service provider blacklist so that the blacklisted phone will no longer be able to access the service provider's network. However, the blacklist is typically based on the IMEI (International Mobile Equipment Identity) number of the phone, which is typically accessible on the phone or on the packing material (which has likely been thrown away). Thus, since some users don't memorize the IMEI of their device, this is often not a viable solution. Some software solutions have also been developed. However, these solutions have typically been easy to defeat since thieves have been able to access the software and delete it, or such solutions have been relatively easy to attack and/or hack.

Accordingly, it may be desirable to develop an improved mechanism for providing device security.

BRIEF SUMMARY OF EXEMPLARY EMBODIMENTS

A method, apparatus and computer program product are therefore provided that may enable the provision of a device recovery mechanism for communication devices such as mobile terminals. Thus, for example, a mechanism may be provided for enabling a device to provide information indicative of its location in response to a determination made locally or remotely that the device has been stolen. Some embodiments of the present invention may not only be used in the context of small or handheld mobile terminals, but may also be used in connection with larger and/or higher value mobile devices such as automobiles.

In an exemplary embodiment, an apparatus for providing device recovery assistance is provided. The apparatus may include at least one processor and at least one memory including computer program code. The at least one memory and the computer program code may be configured, with the processor, to cause the apparatus to perform at least causing a device to be registered with a service, receiving a verification procedure from a platform associated with the service, the verification procedure defining device recovery parameters associated with maintenance of a loss status indicator indicating a loss status of the device, causing a device identifier associated with the device to be stored in a permanent storage medium of the device, and enabling device location reporting based on the received verification procedure in response to a determination that the device is classified as lost or stolen.

In an exemplary embodiment, a method for providing device recovery assistance is provided. The method may include causing a device to be registered with a service, receiving a verification procedure from a platform associated with the service, the verification procedure defining device recovery parameters associated with maintenance of a loss status indicator indicating a loss status of the device, causing a device identifier associated with the device to be stored in a permanent storage medium of the device, and enabling device location reporting based on the received verification procedure in response to a determination that the device is classified as lost or stolen.

In an exemplary embodiment, a computer program product for providing device recovery assistance is provided. The computer program product may include at least one computer-readable storage medium having computer-executable program code portions stored therein. The computer-executable program code portions may include program code portions for causing a device to be registered with a service, receiving a verification procedure from a platform associated with the service, the verification procedure defining device recovery parameters associated with maintenance of a loss status indicator indicating a loss status of the device, causing a device identifier associated with the device to be stored in a permanent storage medium of the device, and enabling device location reporting based on the received verification procedure in response to a determination that the device is classified as lost or stolen.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
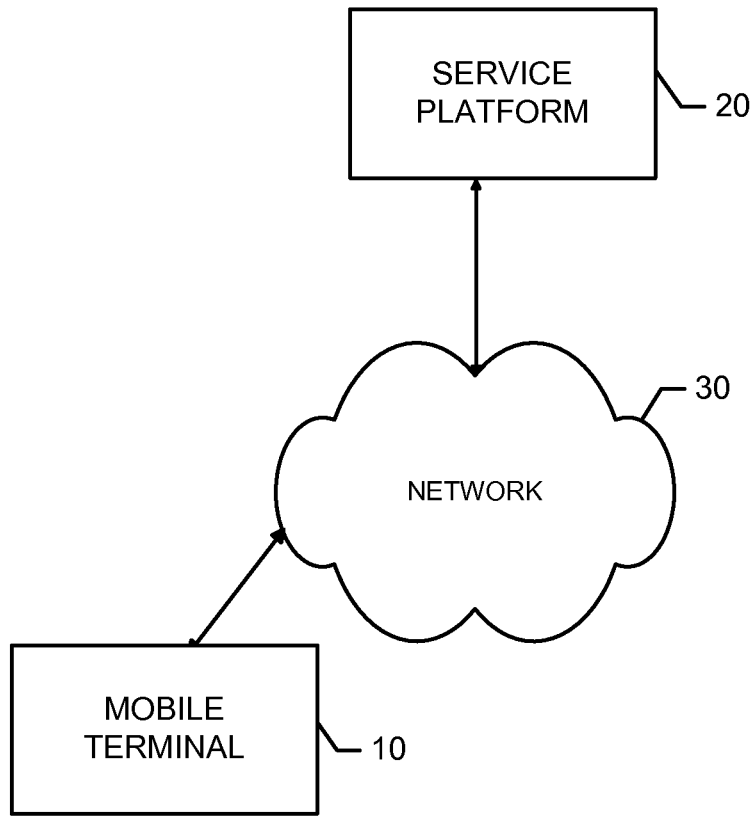
FIG. 1 is a schematic block diagram of a system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

According to an exemplary embodiment, a device that is lost or stolen may become aware of its circumstance and begin reporting its location to assist in locating the lost or stolen device. The mechanisms by which the device becomes aware that it is stolen or lost are described herein along with the mechanisms by which the lost or stolen device deals with such a situation. Notably, the specific examples described herein are merely exemplary of possible mechanisms for employing embodiments of the present invention and do not represent the only mechanisms for employing embodiments of the present invention.

FIG. 1 illustrates a generic system diagram in which a device such as a mobile terminal 10 is shown in an exemplary communication environment. As shown in FIG. 1, an embodiment of a system in accordance with an example embodiment of the present invention may include a communication device (e.g., mobile terminal 10) configured to be capable of communication with a service platform 20 via a network 30. In some cases, embodiments of the present invention may further include one or more additional communication devices to which the mobile terminal 10 may communicate via the network 30. In some embodiments, not all systems that employ embodiments of the present invention may comprise all the devices illustrated and/or described herein. The mobile terminal 10 which is illustrated and hereinafter described for purposes of example, may be any of numerous types of devices, such as portable digital assistants (PDAs), pagers, mobile televisions, mobile telephones, gaming devices, laptop computers, cameras, video recorders, audio/video players, radios, global positioning system (GPS) devices, or any combination of the aforementioned, and other types of voice and text communications systems, can readily employ embodiments of the present invention. Furthermore, the mobile terminal 10 may be a fixed or mobile device within a mobile platform. For example, the mobile terminal 10 may be a fixed communication device within an automobile or other mobile device.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like.

One or more communication terminals such as the mobile terminal 10 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 via the network 30. By directly or indirectly connecting the mobile terminal 10 and other communication devices to the network 30, the mobile terminal 10 may be enabled to communicate with the other devices or network devices such as the service platform 20, for example, according to numerous communication protocols including Hypertext Transfer Protocol (HTTP) and/or the like, to thereby carry out various communication or other functions of the mobile terminal 10 and the service platform 20, respectively.

Furthermore, although not shown in FIG. 1, the mobile terminal 10 may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10 may be enabled to communicate with the network 30, the service platform 20 and other devices by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., a service associated with aiding in device recovery), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

In an exemplary embodiment, the mobile terminal 10 may comprise an apparatus (e.g., the apparatus of FIG. 2) capable of employing embodiments of the present invention. In some cases, the mobile terminal 10 may provide information to and/or receive information from the service platform 20 relating to determinations regarding the status of the mobile terminal 10 with respect to theft or loss and communications associated with recovery assistance in the event the mobile terminal 10 is classified as being lost or stolen. Of note, since the owner of a mobile terminal 10 that is lost or stolen may not know the status of the mobile terminal 10 and since in either case the mobile terminal 10 is essentially absent or lost from the perspective of the owner of the mobile terminal 10, the term "loss status" will hereinafter be used to refer to the status of the mobile terminal 10 with respect to being lost or stolen on the one hand, or not lost or stolen on the other hand. Thus, if the loss status of a mobile terminal is "lost", the mobile terminal may consider itself lost or stolen, while if the loss status of the mobile terminal is anything other than "lost", the mobile terminal may not consider itself to be lost or stolen. However, in some cases, a specific separate state of "stolen" may also be defined. In either case, the actions of the apparatus 50 may be essentially the same, although in the case of a stolen terminal, law enforcement authorities may be informed.

Figure 2:
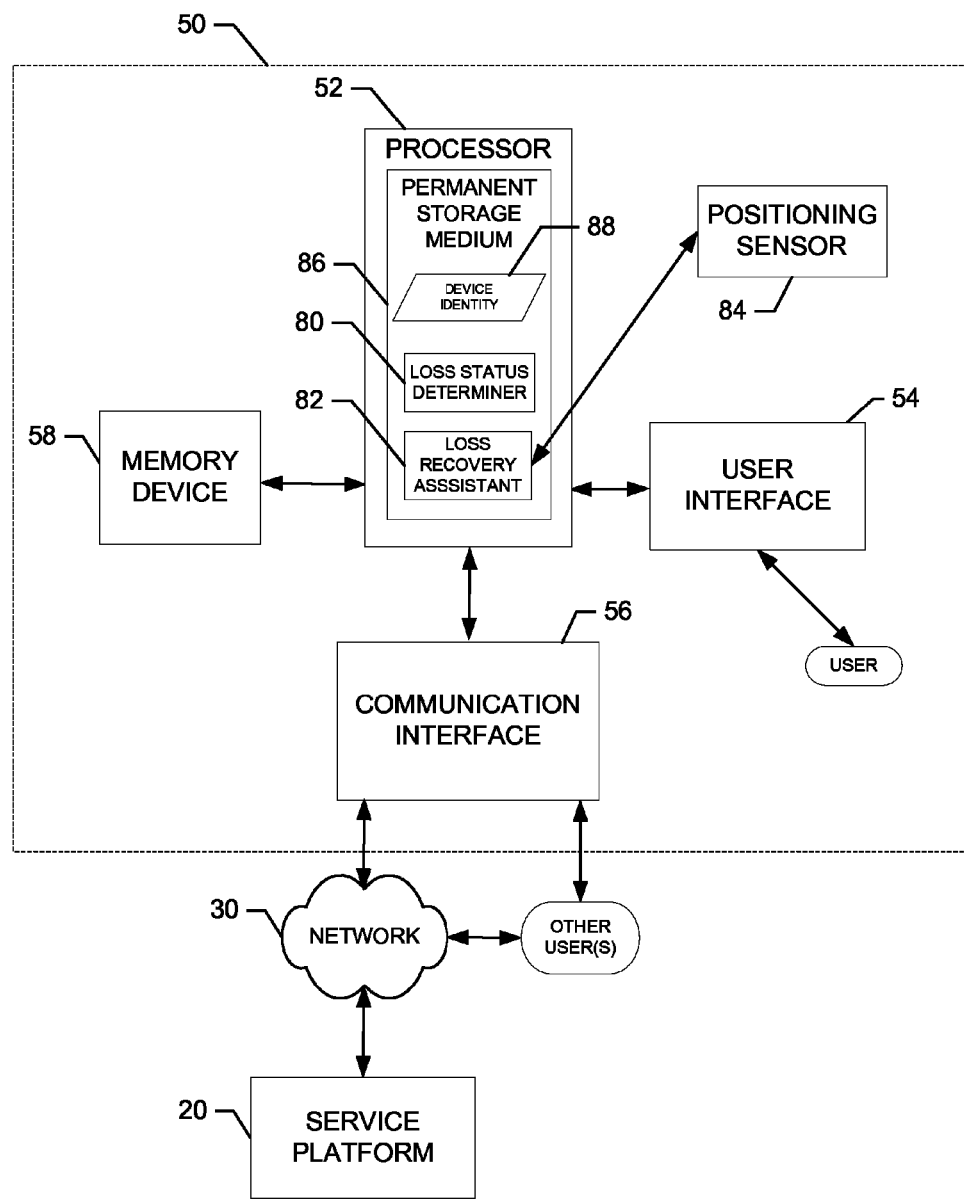
FIG. 2 is a schematic block diagram showing an apparatus for enabling the provision of device recovery assistance according to an exemplary embodiment of the present invention.

FIG. 2 illustrates a block diagram of an apparatus that may benefit from embodiments of the present invention. It should be understood, however, that the apparatus as illustrated and hereinafter described is merely illustrative of one apparatus that may benefit from embodiments of the present invention and, therefore, should not be taken to limit the scope of embodiments of the present invention. In one exemplary embodiment, the apparatus of FIG. 2 may be employed on a mobile terminal (e.g., mobile terminal 10) capable of communication with other devices via a network. However, not all systems that may employ embodiments of the present invention are described herein. Moreover, other structures for apparatuses employing embodiments of the present invention may also be provided and such structures may include more or less components than those shown in FIG. 2. Thus, some embodiments may comprise more or less than all the devices illustrated and/or described herein. Furthermore, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, an apparatus 50 for providing device recovery assistance is provided. The apparatus 50 may include or otherwise be in communication with a processor 52, a user interface 54, a communication interface 56 and a memory device 58. The memory device 58 may include, for example, volatile and/or non-volatile memory. The memory device 58 may be configured to store information, data, applications, instructions or the like for enabling the apparatus to carry out various functions in accordance with exemplary embodiments of the present invention. For example, the memory device 58 could be configured to buffer input data for processing by the processor 52. Additionally or alternatively, the memory device 58 could be configured to store instructions for execution by the processor 52. As yet another alternative, the memory device 58 may be one of a plurality of databases or storage locations that store information and/or media content.

The processor 52 may be embodied in a number of different ways. For example, the processor 52 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 52 may be configured to execute instructions stored in the memory device 58 or otherwise accessible to the processor 52. As such, whether configured by hardware or software methods, or by a combination thereof, the processor 52 may represent an entity capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52, which may otherwise be a general purpose processing element if not for the specific configuration provided by the instructions, to perform the algorithms and operations described herein. However, in some cases, the processor 52 may be a processor of a specific device (e.g., a mobile terminal) adapted for employing embodiments of the present invention by further configuration of the processor 52 by instructions for performing the algorithms and operations described herein.

The user interface 54 may be in communication with the processor 52 to receive an indication of a user input at the user interface 54 and/or to provide an audible, visual, mechanical or other output to the user. As such, the user interface 54 may include, for example, a keyboard, a mouse, a joystick, a display, a touch screen, a microphone, a speaker, or other input/output mechanisms.

Meanwhile, the communication interface 56 may be any means such as a device or circuitry embodied in either hardware, software, or a combination of hardware and software that is configured to receive and/or transmit data from/to a network and/or any other device or module in communication with the apparatus 50. In this regard, the communication interface 56 may include, for example, an antenna (or multiple antennas) and supporting hardware and/or software for enabling communications with a wireless communication network. In fixed environments, the communication interface 56 may alternatively or also support wired communication. As such, the communication interface 56 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 56 may include hardware and/or software for supporting communication mechanisms such as Bluetooth, Infrared, ultra-wideband (UWB), WiFi, and/or the like.

In an exemplary embodiment, the processor 52 may be embodied as, include or otherwise control a loss status determiner 80, a loss recovery assistant 82 and a positioning sensor 84. The loss status determiner 80, the loss recovery assistant 82 and the positioning sensor 84 may each be any means such as a device or circuitry embodied in hardware, software or a combination of hardware and software (e.g., processor 52 operating under software control, the processor 52 embodied as an ASIC or FPGA specifically configured to perform the operations described herein, or a combination thereof) that is configured to perform the corresponding functions of the loss status determiner 80, the loss recovery assistant 82 and the positioning sensor 84, respectively, as described below.

The positioning sensor 84 may include, for example, a GPS sensor, an Assisted-GPS (A-GPS) sensor, and/or the like. In some exemplary embodiments, the positioning sensor 84 includes a pedometer or inertial sensor. As an alternative, the positioning sensor 84 may include components enabling a determination of mobile terminal 10 position based on triangulation with respect to signals received from various sources, based on cell ID information or based on other mechanisms for locating mobile terminals such as cellular telephones. Accordingly, the positioning sensor 84 may be capable of determining a location of the mobile terminal 10, such as, for example, longitudinal and latitudinal directions of the mobile terminal 10, or a position relative to a reference point such as a destination or start point. Information from the positioning sensor 84 may then, in some cases, be communicated to a memory of the mobile terminal 10 or to another memory device to be stored as a position history or location information.

When devices are stolen, one of the first things a sophisticated thief will likely do is to take the device offline, forge a new identity for the device and then bring the device back online In the context of mobile phones or similar communication devices, this process typically involves operations such as powering the stolen device down, flashing new software into the device, deleting all user-related information, and writing a new identity (e.g., an IMEI) into the device (which in some cases may include writing the new IMEI on a sticker in the device). For a car, this process may involve registering new license plates, a new engine and chassis number and/or vehicle identification number, forging title documents or other papers, and possibly also performing the procedures above for mobile communication devices therein if the car includes a communication system. The processes above are aimed at concealing the old identity and providing the device with a new and fraudulent identity. Accordingly, given that thieves instinctively attempt to erase traces of the old identity, embodiments of the present invention provide for the loss status determiner 80 and the loss recovery assistant 82 to be difficult to alter without destroying the device to thereby make it difficult to erase the old identity. By making conversion of a stolen device into a useful device with a fraudulent identity a difficult or fruitless endeavor, not only may embodiments of the present invention render assistance to locating lost or stolen devices, but embodiments may also reduce the incidence of device theft.

Accordingly, in order to provide a recover aid involving an identity that is impractical to remove (e.g., renders the device useless when removed), embodiments of the present invention provide for the safety of such information based on how the identity information is stored. Programmable, erasable or otherwise reconfigurable memory may be altered and therefore typically would not serve as a suitable medium for storing identity information that is desired for protection. Meanwhile, a memory device such as a read only memory (ROM) in which data may be written one time and stored until the memory device is destroyed provides a good model. Accordingly, embodiments of the present invention may store a device identity, which may act as a fingerprint of the device that cannot be destroyed without destroying the device or medium in which the device identity is stored, in a memory device that is protected from power loss, can be written to only once, and cannot be removed without destruction of the medium storing the device identity or fingerprint. As such, the medium for storing the device identity may be an integral part of the device (e.g., mobile terminal 10) itself and possibly also a part for which access to spares is limited.

In an exemplary embodiment, a processor chip may be a suitable platform for a permanent storage medium 86 in which a device identity 88 (e.g., IMEI or another unique fingerprint-type identity) of the mobile terminal 10 and in some cases also instructions for configuring the processor 52 to implement the loss status determiner 80 and the loss recovery assistant 82 may be stored. In other words, the processor 52 may include the permanent storage medium 86 such that tampering with the permanent storage medium 86 would be likely to destroy the processor 52 and render the apparatus 50 useless. The device identity 88 may be written to permanent storage medium 86 along with instructions and/or parameters defining the loss status determiner 80 and the loss recovery assistant 82 as verification procedure information when the apparatus 50 is registered with a recovery assistance service associated with the service platform 20.

The loss status determiner 80 may be configured to determine the loss status (e.g., lost or not lost) of the mobile terminal 10. In an exemplary embodiment, upon purchasing the apparatus 50, the device identity 88 may be registered with the service platform 20. The service platform 20 may also store information defining the capabilities of the apparatus 50 in association with the device identity 88. In some embodiments, the loss status determiner 80 may be configured to determine status based on a loss status flag being set or not. If the flag is set (or alternatively not set) the loss status determiner 80 may consider the apparatus 50 to be stolen or lost. Meanwhile, if the flag is not set (or alternatively set) the loss status determiner 80 may consider the apparatus 50 to be not stolen. In some cases, the loss status flag may remain in a default state (e.g., not set or otherwise indicative of a not stolen condition) to indicate that the device is not stolen until a stimulus triggers changing of the state (e.g., to set the flag). A trigger for altering the state of the loss status flag may be received from an external source (e.g., by message from the service platform 20 indicating that the apparatus 50 has been reported lost or stolen) or internally (e.g., in response to a determination made by the loss status determiner 80).

In an exemplary embodiment, the service platform 20 may be associated with a service by which users who lose their mobile terminals or have them stolen may report such devices as being lost or stolen. Based on the initial registration of the user with the service, the device identity 88 of the apparatus 50 may be stored at the service platform 20 as described above. In response to the user registered as the owner of the apparatus 50 authenticating himself or herself with the service platform 20, the registered user may provide an indication to the service platform 20 that the apparatus 50 is lost or stolen. The service platform 20 may then page or otherwise communicate with the apparatus 50 to provide a message indicting that the apparatus 50 is reported as being lost or stolen. Such communication may be initiated by the service platform 20 or may be provided in response to a verification information check initiated by the apparatus 50 as described below. Receipt of such a message may then trigger the loss status determiner 80 to alter the loss status flag from the default position to a position indicating that the apparatus 50 is lost or stolen. In practice, an Open Mobile Alliance Device Management (OMA DM) message may be used to provide the indication from the service platform 20 to the apparatus 50. However, other messages may alternatively be used.

In embodiments where the apparatus 50 initiates determinations regarding loss status internally, the loss status determiner 80 may be configured to initiate such determinations periodically. In this regard, for example, the loss status determiner 80 may be configured to utilize verification information stored within the permanent storage medium 86 to make loss status checks at predetermined intervals. In some embodiments, a fixed interval for making verification information checks may be defined. However, in other embodiments, minimum and maximum intervals may be defined. In response to passing of the maximum time interval without completion of a verification procedure, the loss status determiner 80 may alter the loss status flag to indicate that the device is lost or stolen. In some cases, the intervals may include a grace period beyond the passing of the predetermined time interval. In response to passing of the predetermined time interval without completion of a verification procedure, if the grace period also passes without completion of the verification procedure, the loss status determiner 80 may alter the loss status flag to indicate that the device is lost or stolen.

In an exemplary embodiment, the service platform 20 may write information defining the verification procedure for the apparatus 50 into the permanent storage medium 86 in response to the apparatus registering for the recovery assistance service provided by the service platform 20 as indicated above. In some examples, OMA DM may be used for providing the verification procedure to the apparatus 50. In this regard, for example, the verification procedure may define not only the intervals at which verification information checks are to be performed, but may further define the communication mechanisms by which the verification information checks are to be conducted. For example, the verification procedure may direct the apparatus 50 to utilize Short Message Service (SMS), Transmission Control Protocol/Internet Protocol (TCP/IP), HTTP, Multimedia Messaging Service (MMS), or other like communication mechanisms to perform verification information checks.

The verification information checks may be automatically initiated by the loss status determiner 80 at intervals defined by the verification procedure. In some embodiments, the verification information checks may be performed according to or by using a verification template that may be defined by the service platform 20 at registration and stored in the permanent storage medium 86. As an example, the verification procedure may define a minimum verification target of one month (or some other period), thereby instructing the loss status determiner 80 to initiate automatic verification information checks no more often than once monthly. The minimum verification target may reduce the consumption of network resources that may be experienced if checks are performed at relatively short intervals by a large volume of subscriber devices. The verification procedure may also define a maximum verification target of six months (or some other period), thereby instructing the loss status determiner 80 to initiate automatic verification information checks at least every six months. A grace period of one week may instruct the loss status determiner 80 to alter the status of the apparatus 50 to indicate loss or theft if verification checks have not taken place within one week of the expiration of the maximum verification target. A verification template may take any of the following example forms:

a. HTTP; verify.operator.com/corporate?fingerprint (which may direct fetching of a designated web page (e.g., a blank HTML page)), b. MMS; +358501234568; subject:fingerprint (which may direct sending of an MMS to the number listed including the fingerprint (e.g., device identifier 88) in the subject), and c. SMS; +358501234567; body:fingerprint (which may direct sending of an SMS to the number listed including the fingerprint (e.g., device identifier 88) in the subject).

However, other forms for the verification template are also possible.

The verification procedure may, in some cases, define an order in which several different communication mechanisms (e.g., based on device capability) may be attempted in order to complete a verification information check. In an exemplary embodiment, if the loss status determiner 80 initiates a verification information check by attempting to fetch a designated web page, and fails to do so or HTTP is not available, then the verification information check may fail. Similarly, if the loss status determiner 80 attempts to send an MMS or SMS to the designated number in the verification template, but does not receive a delivery notification, the verification information check may fail. In some cases, if one communication mechanism fails, another communication mechanism (e.g., in a designated order) may be attempted and the verification information check may not fail until all available communication mechanisms have individually failed. If verification information checks fail, the loss status determiner 80 may indicate the loss status of the apparatus 50 by setting the loss status flag accordingly. In some cases, indication of a change in the loss status may be subject to the further expiration of the grace period or may trigger a delay prior to reattempting a verification information check with a limited number of retries being allowed prior to a failure determination being ultimately made.

In an exemplary embodiment, the service platform 20 may be the recipient of or may be aware of the verification information checks made by the loss status determiner 80. In such scenarios, the service platform 20 may deny access to the web page or refuse to provide a delivery notification for a stolen device. However, as an alternative, the service platform 20 could provide a direct indication to the loss status determiner 80 that the apparatus 50 has been reported lost or stolen in response to a verification information check.

Regardless of how the apparatus 50 is determined to be lost or stolen and has the status thereof locally updated (e.g., via setting the loss status flag), after a loss status change is made from the default (e.g., non-lost or stolen) setting is made, the loss recovery assistant 82 may be configured to initiate reporting. In an exemplary embodiment, the loss recovery assistant 82 may be triggered by a loss status change from the default setting to a setting indicating a lost status into determining device position via the positioning sensor 84. In this regard, for example, when the loss status flag is set, the loss recovery assistant 82 may be configured to acquire location information (e.g., by GPS, A-GPS, triangulation, cell ID, or the like) from the positioning sensor 84 and make reports on the location information to the service platform 20. The reports made to the service platform 20 may be used to guide authorities, the user or other personnel to a stolen device or lost device.

In an exemplary embodiment, the reporting made by the loss recovery assistant 82 may be made at predefined intervals. In this regard, for example, the verification procedure defined by the service platform 20 in response to registration of the apparatus 50 and stored in the permanent storage medium 86 may include information identifying a report interval or report period (e.g., defined in increments of second, minutes, hours or even days) defining the frequency with which reports providing location information are to be made to the service platform 20. In an exemplary embodiment, the loss recovery assistant 82 may utilize a reporting template to make reports to the service platform 20. The reporting template may be provided (e.g., via OMA DM) to the loss recovery assistant 82 in response to registration of the apparatus 50 in a similar fashion to the provision of the verification templates described above. In general, the reporting template may identify a communication mechanism (e.g., HTTP, MMS, SMS, or the like), location information and the fingerprint (e.g., device identifier 88) of the apparatus 50. Examples of formats for the reporting template may include:

a. HTTP; reports.operator.com/corporate?fingerprint= location (directing a fetch of the corresponding blank HTML page),
   b. MMS; +358501234568; subject:fingerprint body:location (directing sending of an MMS to the listed number (e.g., associated with the service platform 20) including the fingerprint in the subject and the location information (e.g., of the apparatus 50) in the body), and
   c. SMS; +358501234567; body:fingerprint+location (directing sending of an SMS to the listed number (e.g., associated with the service platform 20) including the fingerprint and the location information in the message body).

As with the verification template, the reports may be attempted via each of various different mechanisms on a priority order basis.

Figure 3:
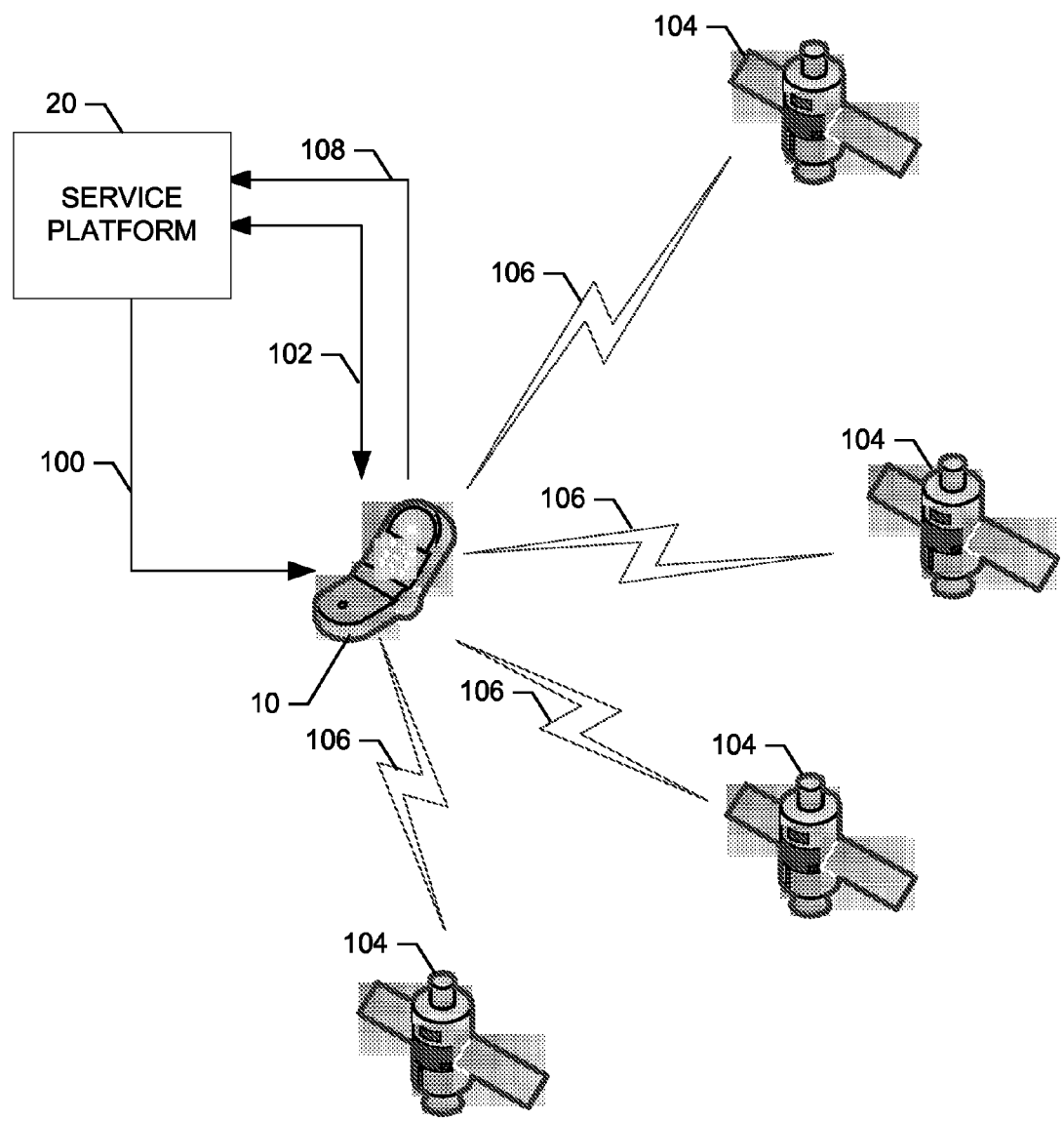
FIG. 3 is a diagram illustrating operation of an example system according to an exemplary embodiment of the present invention.

FIG. 3 shows a diagram of an example operation of an exemplary embodiment of the present invention. In this regard, as shown in FIG. 3, at operation 100, the service platform 20 may provide the verification procedure to the mobile terminal 10 during registration of the mobile terminal 10. The verification procedure may include information defining verification and response templates and parameters as described above. The verification procedure may also write the device identifier 88 into the permanent storage medium 86. At operation 102, verification information checks may be accomplished by the loss status determiner 80 exchanging information with or receiving information from the service platform 20. A result of operation 102 may, in some cases, indicate that the loss status be changed to reflect a loss. Accordingly, the loss recovery assistant 82 may then perform a position determination (e.g., via the GPS satellites 104 or some other positioning mechanism) by receiving positioning information (e.g., timing signals) at operation 106. The mobile terminal 10 may then communicate reports to the service platform 20 at defined intervals at operation 108. The reports may assist in recovery of the mobile terminal 10 by leading authorities or some other monitoring party to the location of the mobile terminal 10.

Figure 4:
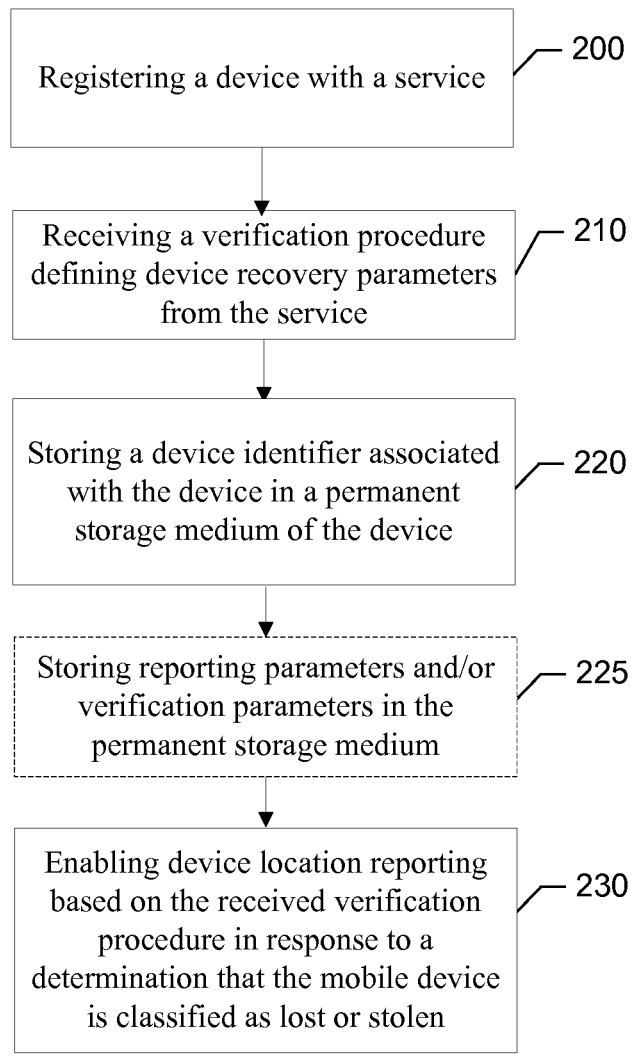
FIG. 4 is a flowchart according to an exemplary method of providing device recovery assistance according to an exemplary embodiment of the present invention.

FIG. 4 is a flowchart of a system, method and program product according to exemplary embodiments of the invention. It will be understood that each block of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor (e.g., the processor 52). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

FIG. 4 shows a block diagram of a method for providing device recovery assistance according to an exemplary embodiment. In an exemplary embodiment, the operations of FIG. 4 may include registering (or causing registration of) a device with a service (e.g., a device recovery service) at operation 200. The method may further include receiving a verification procedure defining device (e.g., mobile device) recovery parameters at operation 210. The verification procedure may be received from a platform associated with the service and may define parameters associated with the maintenance of a loss status indicator (e.g., via a loss status flag) indicating the loss status of the mobile device. The method may further include storing (or causing storage of) a device identifier associated with the device in a permanent storage medium of the device as indicated at operation 220. In some cases, the permanent storage medium may be housed within the housing of the processor or central processing unit (CPU) of the device. The method may further include enabling device location reporting based on the received verification procedure in response to a determination that the mobile device is classified as lost or stolen at operation 230.

In some embodiments, the method may include further optional operations, an example of which is shown in dashed lines in FIG. 4. Optional operations may be performed in any order and/or in combination with each other in various alternative embodiments. As such, the method may further include an operation of storing reporting parameters and/or verification parameters in the permanent storage medium at operation 225.

In some embodiments, certain ones of the operations above may be modified or further amplified as described below. It should be appreciated that each of the modifications or amplifications below may be included with the operations above either alone or in combination with any others among the features described herein. In this regard, for example, enabling device location reporting may include utilizing the stored reporting parameters to define reports provided to the service. In some cases, enabling device location reporting may include providing an indication of a communication mechanism to be employed for reporting, providing a location report including the location of the device, and providing a device identifier of the device at an interval defined by the reporting parameters.

In an exemplary embodiment, an apparatus for performing the method of FIG. 4 above may comprise a processor (e.g., the processor 52) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the processor 52, the loss status determiner 80, the loss recovery assistant 82 and/or an algorithm executed by the processor 52 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least perform the following:
   cause a device to be registered with a theft, loss control and recovery service;
   receive a verification procedure from a platform associated with the theft, loss control and recovery service, the verification procedure defining device recovery parameters associated with maintenance of a loss status indicator indicating a loss status of the device;
   cause a device identifier associated with the device to be stored in a permanent storage medium of the device; and
   enable device location reporting based on the received verification procedure in response to a determination that the device is classified as lost or stolen.

2. The apparatus of claim 1, wherein the permanent storage medium is housed within a housing of the processor of the device.

3. The apparatus of claim 1, wherein the memory and computer program code are configured to, with the processor, cause the apparatus to enable device location reporting by utilizing stored reporting parameters to define reports to be provided to the theft, loss control and recovery service.

4. The apparatus of claim 1, wherein the memory and computer program code are configured to, with the processor, further cause the apparatus to direct storage of reporting parameters or verification parameters in the permanent storage medium.

5. The apparatus of claim 4, wherein the memory and computer program code are configured to, with the processor, cause the apparatus to enable device location reporting by providing an indication of a communication mechanism to be employed for reporting, providing a location report including the location of the device, and providing a device identifier of the device at an interval defined by the reporting parameters.

6. The apparatus of claim 1, wherein the device is a mobile terminal.

7. The apparatus of claim 1, wherein the memory and computer program code are configured to, with the processor, cause the apparatus to receive the verification procedure including receiving information defining an order in which multiple different communication mechanisms are to be attempted in order to complete a verification information check.

8. The apparatus of claim 1, wherein the memory and computer program code are configured to, with the processor, cause the apparatus to receive the verification procedure including report interval parameters and a corresponding grace period after a reporting interval within which a verification information check is to be completed to avoid classifying the device as lost or stolen.

9. A method comprising:
   causing a device to be registered with a theft, loss control and recovery service;
   receiving a verification procedure from a platform associated with the theft, loss control and recovery service, the verification procedure defining device recovery parameters associated with maintenance of a loss status indicator indicating a loss status of the device;
   causing a device identifier associated with the device to be stored in a permanent storage medium of the device; and
   enabling device location reporting based on the received verification procedure in response to a determination that the device is classified as lost or stolen.

10. The method of claim 9, wherein enabling device location reporting comprises utilizing stored reporting parameters to define reports to be provided to the theft, loss control and recovery service.

11. The method of claim 9, further comprising causing storage of reporting parameters or verification parameters in the permanent storage medium.

12. The method of claim 11, wherein enabling device location reporting comprises providing an indication of a communication mechanism to be employed for reporting, providing a location report including the location of the device, and providing a device identifier of the device at an interval defined by the reporting parameters.

13. The method of claim 9, wherein receiving the verification procedure comprises receiving information defining an order in which multiple different communication mechanisms are to be attempted in order to complete a verification information check.

14. The method of claim 9, wherein receiving the verification procedure comprises receiving report interval parameters and a corresponding grace period after a reporting interval defining a period within which a verification information check is to be completed to avoid classifying the device as lost or stolen.

15. A computer program product comprising at least one non-transitory computer-readable storage medium having computer-executable program code portions stored therein, the computer-executable program code portions comprising:
   program code instructions for causing a device to be registered with a theft, loss control and recovery service;

program code instructions for receiving a verification procedure from a platform associated with the theft, loss control and recovery service, the verification procedure defining device recovery parameters associated with maintenance of a loss status indicator indicating a loss status of the device;

program code instructions for causing a device identifier associated with the device to be stored in a permanent storage medium of the device; and program code instructions for enabling device location reporting based on the received verification procedure in response to a determination that the device is classified as lost or stolen.

16. The computer program product of claim 15, wherein program code instructions for enabling device location reporting include instructions for utilizing stored reporting parameters to define reports to be provided to the theft, loss control and recovery service.

17. The computer program product of claim 15, further comprising program code instructions for directing storage of reporting parameters or verification parameters in the permanent storage medium.

18. The computer program product of claim 17, wherein program code instructions for enabling device location reporting include instructions for providing an indication of a communication mechanism to be employed for reporting, providing a location report including the location of the device, and providing a device identifier of the device at an interval defined by the reporting parameters.

19. The computer program product of claim 15, wherein program code instructions for receiving the verification procedure include instructions for receiving information defining an order in which multiple different communication mechanisms are to be attempted in order to complete a verification information check.

20. The computer program product of claim 15, wherein program code instructions for receiving the verification procedure include instructions for receiving report interval parameters and a corresponding grace period after a reporting interval defining a period within which a verification information check is to be completed to avoid classifying the device as lost or stolen.

* * * * *